(12) United States Patent
Kim (10) Patent No.: US 6,347,841 B1
(45) Date of Patent: Feb. 19, 2002

(54) APPARATUS FOR REGULATING PRESSURE IN THE HYDRAULIC BRAKE SYSTEM

(76) Inventor: Dae Sung Kim, Ga-202 Haeng-un villa, 310-18, Gogang 1 dong, Ojeong-ku, Puchon-si, Kyungki-do (KR)

( * ) Notice: Subject to any disclaimer, the term of this patent is extended or adjusted under 35 U.S.C. 154(b) by 0 days.

(21) Appl. No.: 09/436,653

(22) Filed: Nov. 9, 1999

(51) Int. Cl.[7] .............................................. B60T 17/04
(52) U.S. Cl. ........................... 303/87; 188/351; 138/31
(58) Field of Search .......................... 303/113.4, 115.1, 303/87; 188/351, 196 A; 138/30, 31

(56) References Cited

U.S. PATENT DOCUMENTS

| | | | |
|---|---|---|---|
| 2,923,132 A | * 2/1960 | Oswalt | 60/590 |
| 3,757,825 A | 9/1973 | Givens et al. | |
| 3,819,235 A | 6/1974 | Bowler et al. | |
| 4,121,874 A | * 10/1978 | Knox et al. | 303/10 |
| 4,166,655 A | 9/1979 | Spero | |
| 4,188,073 A | 2/1980 | Ishikawa et al. | |
| 4,220,376 A | * 9/1980 | Spero | 303/87 |
| 4,254,755 A | * 3/1981 | Morgan et al. | 124/6 |
| 4,736,646 A | * 4/1988 | Bertling et al. | 74/470 |
| 5,664,848 A | * 9/1997 | Muraski | 303/87 |
| 6,017,044 A | * 1/2000 | Kawagoe | 280/124.106 |
| 6,254,072 B1 | * 7/2001 | Bono et al. | 267/220 |

* cited by examiner

Primary Examiner—Robert J. Oberleitner
Assistant Examiner—Xuan Lan Nguyen
(74) Attorney, Agent, or Firm—Piper Marbury Rudnick & Wolfe, LLP; Steven B. Kelber (57) ABSTRACT

An apparatus connectable to a brake master cylinder for regulating pressure in a hydraulic brake system. The apparatus includes an outer casing housing a cylinder portion and a piston slidable therewithin. A pressure chamber forms between the cylinder wall and the piston. The piston includes a seal within an outer groove to prevent fluid leakage. The cylinder portion includes an inlet hole for hydraulic fluid flow into the cylinder and an air discharge valve. A fixing member having an extension with a concave portion is threadably attached to the lower end of the case, and a rod portion of the piston slidably fits into the concave portion. A spring providing a constant pre-pressure is located between a shoulder of the piston and a pressure controlling member abutting the fixing member, such that the end of the rod remains a fixed distance from the bottom of the concave portion.

15 Claims, 5 Drawing Sheets

FIG. 1

PRIOR ART

APPARATUS FOR REGULATING PRESSURE IN THE HYDRAULIC BRAKE SYSTEM

FIELD OF THE INVENTION

The present invention relates to an apparatus for regulating pressure in the hydraulic brake system for a vehicle via a brake master cylinder, and, more particularly, to an apparatus for regulating pressure in a hydraulic brake system, the apparatus causing the brake lining and brake shoe to approach each other, such that initial brake response time is reduced, braking efficiency is improved, the slip rate between the vehicle tires and the road is minimized, stopping distance is shortened, and the fluid in the brake master cylinder flows into the apparatus such that the pressure of the brake master cylinder is prevented from rapidly rising during emergency or other urgent application of the brakes.

BACKGROUND

Figure 1:
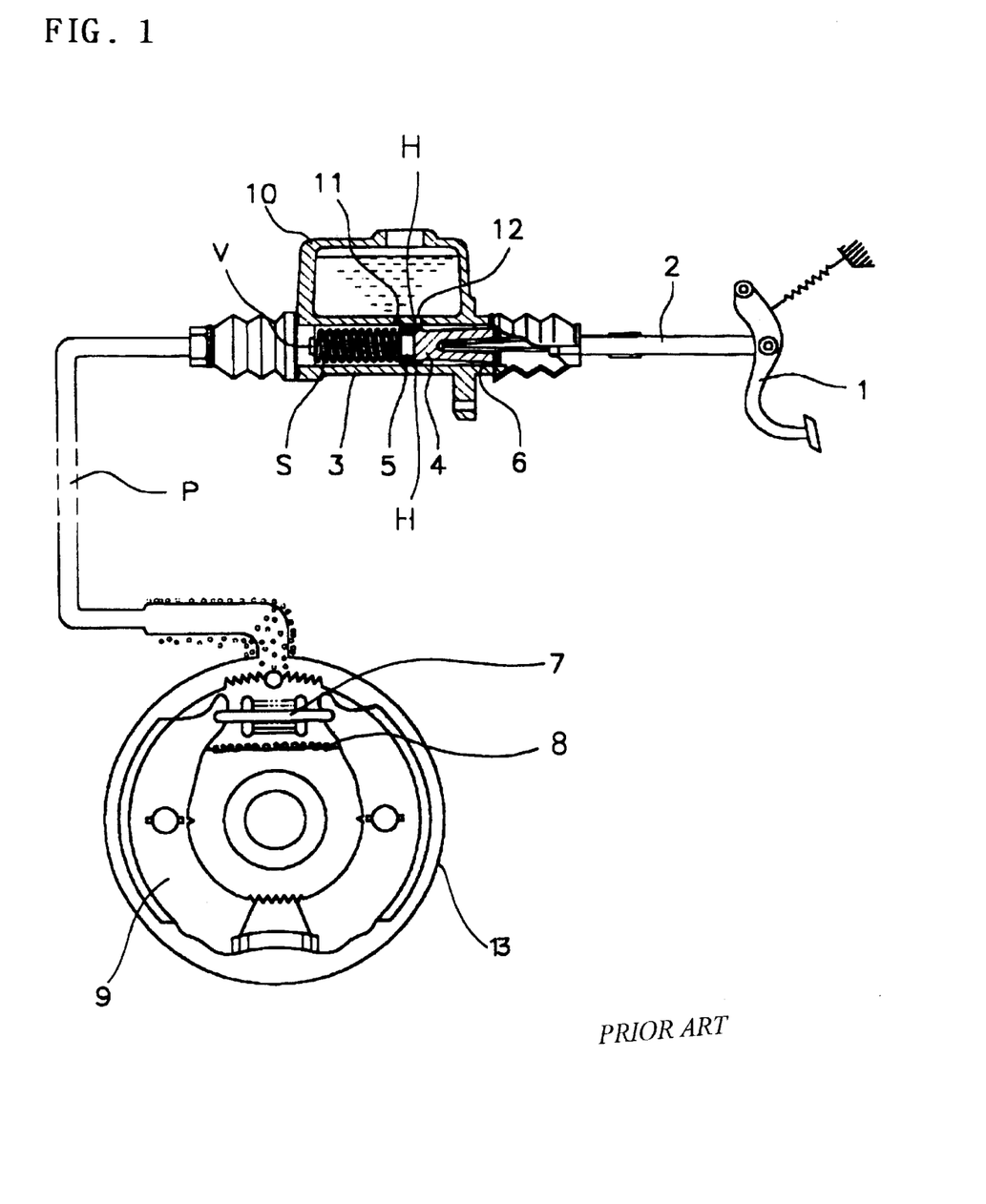
FIG. 1 is a schematic view of a brake system of the prior art.

As described in FIG. 1, in a typical vehicle hydraulic brake system, when the driver applies the brake pedal 1, hydraulic pressure rises in the master cylinder 3, which is typically a tandem master cylinder, and pressure is thereby transmitted to the wheel cylinder 7 through hydraulic line P. The brake shoe 9 is moveable so as to frictionally contact the brake drum 13 via pressure transmitted to the wheel cylinder 7, producing a braking force.

The master cylinder 3 comprises a piston 4, a piston cup 5, a check valve V and a return spring S. A reservoir tank 10 is typically located in close proximity to and communicates with the master cylinder 3, so as to provide a supply of brake fluid. In front of the piston 4 (to the left as viewed in FIG. 1) is located a rubber piston cup 5 to maintain the hydraulic pressure. In the rear (to the right as viewed in FIG. 1) of the piston 4 is located a piston packing 6 to prevent the leakage of brake fluid. If the pressure in the master cylinder 3 is sufficient to activate a check valve V, the check valve V opens and transmits pressure from the master cylinder to the wheel cylinder 7.

Figure 2:
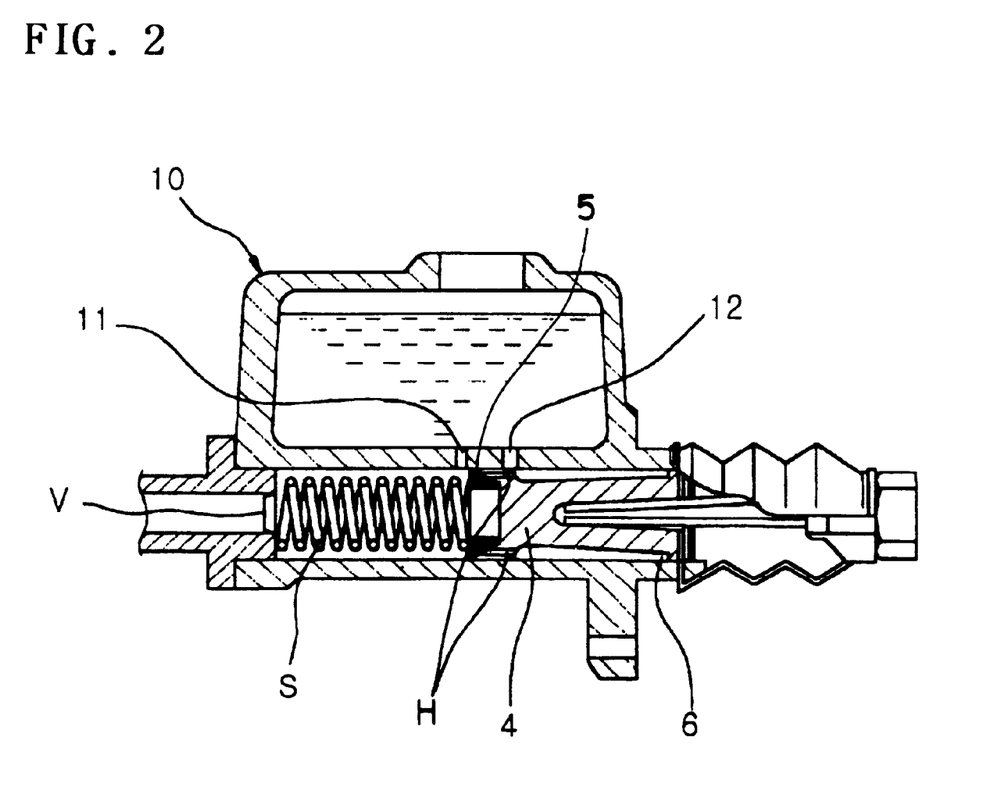
FIG. 2 is a section view showing the schematic structure of a master cylinder of prior art.

If driver releases the brake pedal 1, the piston 4 returns by virtue of return spring S. Upon such return, if the fluid pressure in the master cylinder 3 is sufficiently reduced, this pressure causes the check valve V to close, preventing return of brake fluid to the master cylinder 3. At the front of the piston cup 5 (to the left as viewed in FIG. 1), the pressure drops temporarily during return, and fluid flows into the master cylinder 3 via hole H, which is formed in the piston 4 and about the circumference of the piston cup 5, as described further with respect to FIG. 2. The availability of this flow ensures that the return of the piston 4 is not prevented or impaired due to low pressure in the master cylinder 3.

As the piston 4 returns, brake fluid is able to return to the reservoir tank 10 through the relief port 11 and the inlet port 12. The check valve V remains closed until the pressure in the master cylinder 3 reaches the set-pressure.

Improving the handling of an automobile requires both good acceleration and good deceleration, in turn necessitating a hydraulic brake system having superior characteristics. Such superior characteristics are especially important with respect to safety.

The brake system for a typical vehicle provides a great deal of stopping force, which is utilized to stop the revolution of the vehicle's tires. However, this force can completely stop the vehicle's tire rotation without stopping the vehicle, resulting to slippage of the tires on the road (wheel lock). Such slippage occurs when the slippage force on the tires is less than the braking force. This slippage force is calculated by multiplying the frictional coefficient between the tire and the road by the weight applied to the road via the tire.

Namely, frictional coefficient $\mu$, is extremely low on slippery road surfaces, as occur with the presence of ice or snow, while $\mu$ is much higher on, for example, dry concrete roads. In general, varying by motor vehicle model and road surface, the slip rate has a maximum, from which it quickly drops off.

The formula for the slip rate is expressible as follows:

$$\frac{Y-W}{S} \times 100 = v$$

where:
V−W=the velocity of wheel;
S=the rate of slip; and
V=the velocity of vehicle.

In other words, when the driver applies the brake, it is advisable to maintain the wheels in a state such that the braking force is maximized and just less than the force that causes wheel lock. Safety is reduced and the rate of vehicle deceleration is reduced, resulting in longer stopping distances, when wheel revolution stops and wheel lock occurs.

To help achieve this condition in existing vehicles, hydraulic pressure in the brake system is typically reduced for the rear wheels relative to the front wheels, which prevents handling instability that would otherwise be caused by premature locking of the rear wheels. In existing vehicles, appropriate hydraulic pressure to maintain this condition is achieved through use of the following valves, which are installed on certain portions of tandem brake master cylinders to improve the braking efficiency:

Check valve—this valve improves braking efficiency by preventing return of pressure to the tandem brake master cylinder below a certain predetermined pressure, leaving any remaining pressure in the brake hydraulic lines. As a result, air osmosis is prevented and initial response time is shortened.

P valve (proportioning valve)—this valve is used to control the increase of hydraulic pressure and the triggering pressure point for activation of the brakes. This valve reduces the hydraulic pressure increase rate for the rear wheels as the brake force transmitted from the piston increases.

G valve—this valve controls the pressure of hydraulic fluid transmitted to the rear wheels. The G valve, which uses a ball valve that moves in accordance with a decrease in velocity of the vehicle, causing transfer of pressure among an outlet portion and an inlet portion, resulting in variation in the effective piston area applying the braking pressure.

Load sensing proportioning valve—this valve is used to control the hydraulic pressure to the rear wheels, with the opening position of the valve simultaneously varying in relation to the car weight.

Metering valve—this valve is used to decrease the abrupt hydraulic pressure of the front disk brake in low hydraulic pressure situations by decreasing the hydraulic pressure transmitted to the front wheels until the hydraulic pressure transmitted to the rear wheels becomes higher than the tension of return spring of the rear brake shoe. With this feature, brake pad life is prolonged.

In addition, an anti-lock brake device is used to prevent wheel lock from occurring when, for example, a car is braked on a road with low friction. The anti-lock brake device decreases the stopping distance and helps with control of the car by maintaining the vehicle's direction and enabling steering control by keeping the wheels at the ideal slip rate.

However, in the prior art, the method for controlling hydraulic pressure to obtain the proper braking force, except with regard to the anti-lock device, depends on the driver recognizing the need to provide the correct brake pedal effort and to know to apply the brakes in sufficient time. In an emergency, if a driver applies the brakes strongly (to increase the brake force), wheel lock can occur based on the abrupt pedal stroke and resultant increase in hydraulic brake pressure. The prior art addresses this problem with the use of valves that provide measured decrease of braking pressure and thereby enhance braking safety. However, even with these systems, if the hydraulic pressure increases abruptly in the tandem brake master cylinder, which is the starting point for building hydraulic pressure, wheel lock—the so-called "skid state"—can occur. In this event, stopping distance increases and braking safety decreases abruptly.

SUMMARY OF THE INVENTION

An object of the present invention is to provide an apparatus for regulating pressure in the hydraulic brake system that causes the brake lining and brake shoe to approach each other in such a manner that when a driver applies the brakes, the initial response time is shortened, braking efficiency is improved, the slip rate between the tire and the road is kept in the ideal state, stopping distance is shortened, and fluid in the tandem brake master cylinder flows into the inventive apparatus so as to prevent the pressure of the tandem brake master cylinder from rising too rapidly, even in the event of a driver urgently applying the brake pedal.

An embodiment of the present invention includes an apparatus characterized as follows: a head of a piston is inserted into an upper cylinder of a housing so as to slide within the cylinder and forming a pressure chamber between the upper surface of the housing and the head of the piston; a sealing member is placed in a groove formed on the circumference of the piston near the head, the sealing member preventing leakage of hydraulic fluid past the head of the piston; a fixing member is threadably secured about the lower part of the housing; the lower end of a rod for coupling to the piston is inserted in a projecting extension having a concave opening that is formed on the fixing member; a spring is placed between a shoulder on the piston and the fixing member in order to support the piston such that the spring is compressibly loaded to provide a constant opposing pressure between the piston and the fixing member; a pressure controller pad located between the spring and the upper surface of the fixing member; an inlet hole in the upper cylinder through which brake fluid is able to flow into the pressure chamber; and an air discharge valve in the upper chamber for bleeding air from the pressure chamber.

In an embodiment of the present invention, the lower end of the rod coupled to the piston is located at a distance from the bottom of the projecting concave extension of the fixing member such that the piston is capable of moving a fixed distance, the fixed distance being the distance between the bottom of the projecting concave and the lower end of the rod, the movement being opposite the spring pressure, and the movement occurring when the pressure in the pressure chamber is higher than the pressure loading of the spring.

In an embodiment of the present invention, movement of the piston is limited by a shoulder within the housing.

An embodiment of the present invention includes a pressure controller pad that controls any unbalance of the spring at its contact point with the fixing member and at the same time reduces the elastic resistance of the spring with respect to the housing and the fixing member.

In an embodiment of the present invention, as the rod moves relative to the projecting extension concave section, openings form and are closed in the wall of the projecting extension, through which air is able to pass.

In one embodiment, in which the apparatus of the present invention is directly connected to the brake master cylinder, an inlet hole is formed in the horizontal surface of the upper cylinder and an air discharge valve is secured on the side surface of the upper cylinder.

In one embodiment, in which the apparatus of the present invention is directly connected to the brake master cylinder, the inlet hole is directly attached to the tandem master cylinder. In another embodiment, in which the apparatus of the present invention is indirectly connected to the brake master cylinder, the pressure regulating device is connected to the master cylinder by a connecter and pipes.

In another embodiment, in which the apparatus of the present invention is indirectly connected to the brake master cylinder, two housing portions are formed into a single connected body.

In one embodiment, the apparatus of the present invention is located downstream of hydraulic fluid flow of top dead center of the tandem brake master cylinder in the advancing direction of the primary and the secondary ring figured cups.

An embodiment of the present invention includes bleeding air from the system, which is accomplished by raising the pressure of the tandem brake master cylinder, discharging pressure via the check valve, and compensating for pressure difference, such that a narrow gap is maintained between the brake lining and the drum.

DETAILED DESCRIPTION

Figure 3:
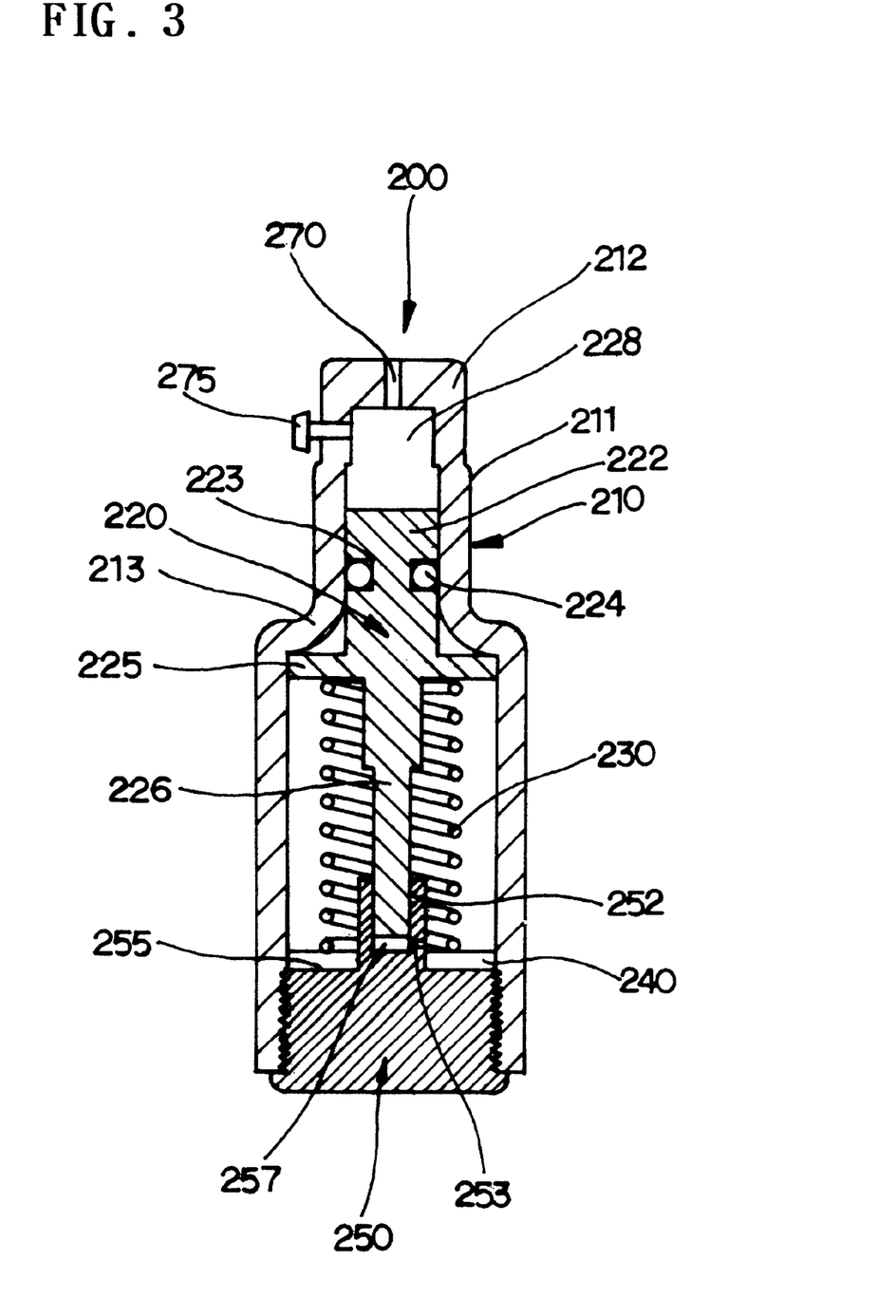
FIG. 3 is a section view showing the inventive apparatus in accordance with an embodiment of the present invention.
Figure 4:
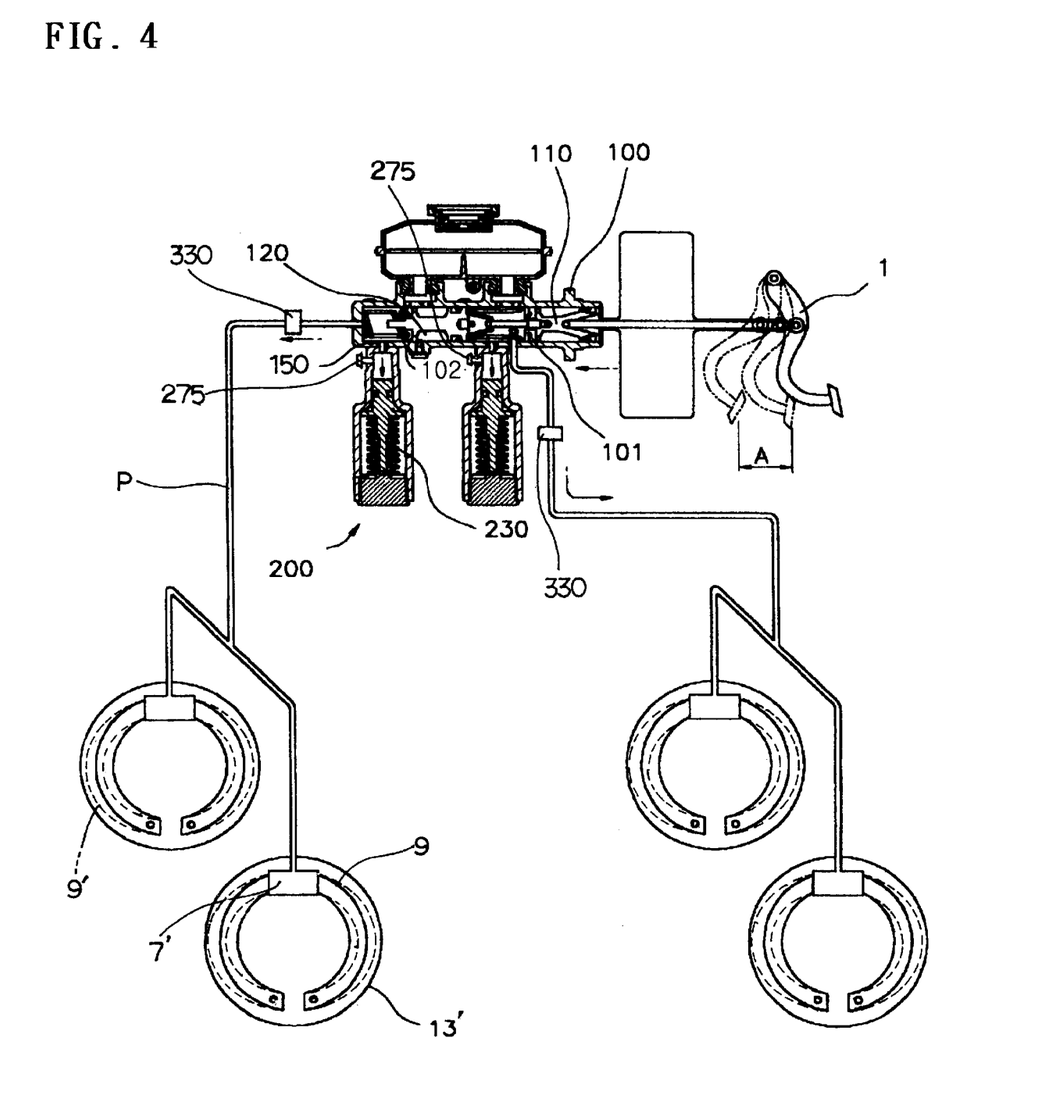
FIG. 4 shows schematically an embodiment of the present invention, in which the inventive apparatus is directly connected to the tandem master cylinder.
Figure 5:
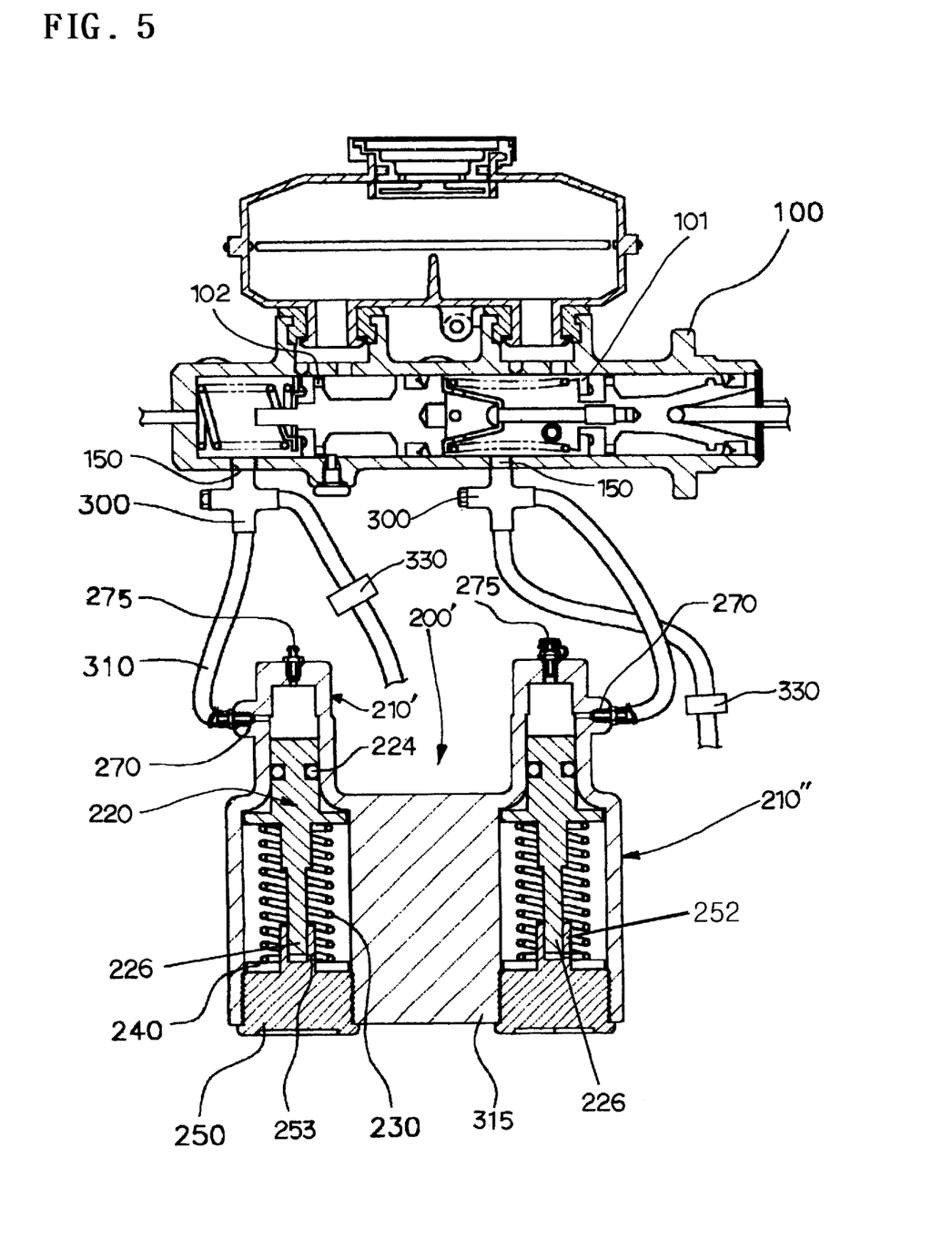
FIG. 5 shows schematically another embodiment of the present invention, in which the inventive apparatus is indirectly connected to the tandem master cylinder.

The invention is now described in detail, as follows. FIG. 3 is a section view of the apparatus in accordance with one embodiment of the present invention, showing the pressure regulating device 200. FIG. 4 shows a pressure regulating device 200 that is directly connected to the hole 150 of the master cylinder 100 by threadable connection. FIG. 5 shows a pressure regulating device 200' that is connected to holes 150 of the master cylinder 100 via connecters 300 and a pipes 310.

In FIG. 3 and FIG. 4, the pressure regulating device 200 comprises a piston 220 with a head 222 inserted in the upper cylinder 211 of the housing 210, such that the piston 220 and head 22 are capable of moving up and down within the upper cylinder 211, as viewed in FIG. 3. A pressure chamber 228 is formed between the upper surface 212 of the housing 210 and the head 222 of the piston 220. A sealing member 224 is placed in a groove 223 formed in the intermediate of head 222 of the piston 220 in order to prevent hydraulic fluid leakage.

A fixing member 250 is threadably attached to the lower part of the housing 210 such that the lower end of the rod 226 of the piston 220 is inserted in the concave portion of the projecting extension 252 formed in the fixing member 250. One or more openings 253 in the wall of the projecting extension 252 allow air flow into and out of the concave portion of the projecting extension 252.

A spring 230 is compressibly placed between an expansion portion 225 of the piston 220 and the fixing member 250 so as to support the piston 220, with the lower end of the rod 226 of the piston 220 located at set distance from the bottom of the concave portion of the projecting extension 252.

If the pressure of pressure chamber 228 is higher than the pre-pressure of the spring 230, the piston 220 drops to the bottom of concave portion of the projecting extension 252.

The expansion portion 225 of the piston 220 is stopped by the shoulder 213 of the housing 210, which limits the rising motion of the piston 220, as viewed in FIG. 3.

The pre-pressure and the spring constant vary, depending on the vehicle model and a pressure controller pad 240 having an "O" like shape, which is arranged between the spring 230 and the upper surface of the fixing member 250. The pressure controller pad 240 controls any unbalance of the spring 230 where the spring 230 abuts the fixing member 250, which is threadably connected to the housing 210. In addition, the pressure controller pad 240 reduces the elastic resistance of spring 230.

The pressure chamber 228 in the housing 210 has an inlet hole 270 for allowing hydraulic fluid to flow to the tandem master cylinder, and an air discharge valve 275 for discharging air from the pressure chamber 228. As shown in FIG. 4, in the embodiment in which the apparatus is directly connected to the brake master cylinder, an opening 270 is formed in the horizontal surface 212 of the cylinder 211, as shown in FIG. 3, and the air discharge valve 275 is located on a side wall of the upper cylinder 211. The embodiment of the pressure regulating device 200' indirectly connected to the master cylinder 100, as shown in FIG. 5, is connected to the master cylinder 100 by a connecter 300 and hydraulic lines 310. The pressure regulating device 200' includes two housing portions 210' and 210" and a connecting body 315, which are formed into a single unit. The device 200' of this embodiment is similar to the pressure regulating device 200, as described in FIGS. 3 and 4, except that the two housing portions 210' and 210" are part of a single unit, and the positions of the inlet hole 270 and the air discharge valve 275 are reversed Preferably, in this embodiment, the pressure regulating device 200' is connected to the tandem brake master cylinder 100 by connecting portions that are connected at similar points in the hydraulic flow relative to the primary and the secondary ring figured cups as the embodiment in which the device 200 is directly connected to the brake master cylinder.

The operation of the pressure regulating device 200' in application for a tandem brake master cylinder on a motor vehicle will now be described.

As shown in FIGS. 3, 4 and 5, after the pressure regulating device 200 or 200' is connected to the tandem brake master cylinder 100, the brake pedal 1 is depressed and released repeatedly to bleed air from the system. Through this process, when the brake pedal 1 is depressed, brake fluid in the tandem brake master cylinder 100 flows from one opening to the wheel cylinder 7' and from another opening to the pressure chamber 228. As this occurs, air in the pressure chamber 228 is discharged through the air discharge valve 275. As the pedal 1 is depressed, when the lining 9' of the brake shoe contacts the brake drum 13', the pressure in the tandem brake master cylinder 100 increases. At this point, if the pressure in the tandem brake master cylinder 100 is higher than the desired pressure as governed by the device 200 or 200', the pressure in the pressure chamber 228 increases until this pressure exceeds the resistive pressure provided by the spring 230, which includes a loaded pre-pressure. Upon this pressure in the chamber 228 exceeding the resistive pressure of the spring 230, the spring 230 compresses, and the piston 220 moves to the bottom of the concave portion of the projecting extension 252.

Upon the pedal 1 being released, by function of the return spring in the tandem brake master cylinder 100, the primary ring figured cup 101 and the secondary ring figured cup 102 move toward the brake pedal 1, and the inner pressure within tandem brake master cylinder 100 falls abruptly. At this moment, the restoring force of the spring 230 within the pressure regulating device 200 or 200' exceeds the pressure of pressure chamber 228, and the brake fluid stored in the pressure chamber 228 flows into the tandem brake master cylinder 100 up to the limit provided by volume of the space 257.

As a result of this operation, brake fluid from the pressure regulating device 200 or 200' returns to the tandem brake master cylinder 100 before fluid from the wheel cylinder 7' returns to tandem brake master cylinder 100 because the pressure in pressure chamber 228 resulting from the pressure of the spring 230 is higher than the pressure typically present within the tandem brake master cylinder 100. This is further the case because the pressure within the brake master cylinder 100 will have increased, such that this pressure exceeds a desired pressure, as regulated by a check valve 330, resulting in the check valve 330 closing. Because the check valve 330 so closes, with some amount of brake fluid remaining within the wheel cylinder 7', the gap between the brake drum 13' and the brake lining 9' is maintained at a minimum.

As indicated above, the bleeding of air from the brakes also helps to maintain a minimum distance between the drum 13' and the lining 9', while keeping the brake fluid in the pressure chamber 228 of the pressure regulating device 200 or 200' full.

After air is bled from the brakes, if the pedal 1 is slowly depressed, the gap between the drum 13' and lining 9' remains narrow without the pressure regulating device 200 or 200' operating, because the pressure in the tandem brake master cylinder 100 under this condition does not exceed the pressure of the spring 230, which is set with a loaded pre-pressure that is greater than the pressure of the pressure regulating device 200 or 200'.

In an emergency, when the brake pedal 1 is urgently depressed, pressure in the tandem brake master cylinder 100 exceeds that of the spring 230, including the loaded pre-pressure, and brake fluid in the tandem brake master cylinder 100 flows into the pressure chamber 228 of the pressure regulating device 200 or 200'.

Because, in conditions such as the emergency conditions described above, brake fluid flows into the pressure chamber 228 after the lining 9' contacts the brake drum 13', the pressure in the tandem brake master cylinder 100 prevents abrupt pedal stroke motion A of the brake pedal 1, as shown in FIG. 4. In addition, because the piston 220 is able to move as much as the space 257 of the pressure regulating device 200 or 200' allows, the brake lining 9' comes into contact more slowly with the brake drum 13' than would occur absent the present invention, and, as a result, the revolution of wheels are stopped but skid is reduced. The extent to which this effect occurs varies as a function of the power applied to the pedal 1 in an emergency, the speed of the vehicle, the cross-sectional area of the tandem brake master cylinder 100, the cross-sectional area of the piston 220 in the pressure regulating device 200 or 200' relative to the brake pedal's stroke A, the size of the space 257 in the concave portion of the projecting extension 252, and the pre-pressure applied by and the spring constant of the spring 230.

As discussed above, if a vehicle is stopped without wheel lock, steering is improved relative to locked wheel conditions, braking safety is enhanced, the rate of vehicle stopping is increased, and stopping distance is reduced.

Industrial Applicability

As described above, the present invention provides an apparatus for regulating pressure in the hydraulic brake system such that stopping distance is decreased by maintaining a narrowed gap between the brake drum and the brake lining, while braking safety for a vehicle is further enhanced by preventing wheel lock when the brake pedal is abruptly applied.

It will be appreciated by those skilled in the art that changes could be made to the embodiments described above without departing from the broad inventive concept thereof. Therefore it is understood that this invention is not limited to the particular embodiments disclosed, but it is intended to cover modification within the spirit and scope of the present invention as defined by the appended claims.

What is claimed is:

1. An apparatus for regulating hydraulic brake pressure, comprising:
   a housing having a closed cylindrical interior portion and an open end, wherein the closed cylindrical interior portion is capable of receiving hydraulic fluid and includes a hydraulic fluid communication valve, the hydraulic fluid communication valve for communicating pressure via the received hydraulic fluid between the closed cylindrical interior portion and a brake master cylinder via a hydraulic line;
   a piston having a head receivable within the cylindrical interior portion of the housing, an expansion portion, and a rod extension extending opposite the head, the piston being slidable within the cylindrical interior portion of the housing in response to variations in the communicated hydraulic fluid pressure;
   a fixing member fixably attachable to the housing via the open end, the fixing member having an extension extending into the housing, wherein the fixing member extension has a concave portion for receiving the rod extension of the piston wherein the fixing member extension concave portion has at least one wall, the at least one wall having at least one opening; wherein air is containable within the fixing member extension concave portion, wherein the sliding of the piston within the housing produces movement of an end of the rod extension of the piston, such that the distance between the end of the rod and the fixing member extension concave portion varies, and wherein air flows to and from the fixing member extension concave portion via the at least one opening in response to sliding of the piston in the housing;
   a spring extending between the expansion portion of the piston and the fixing member, the spring having a first end and a second end, the first end of the spring abutting the expansion portion of the piston, wherein the spring biasedly opposes movement of the piston toward the fixing member; and
   a pressure controller pad abuttably located between the second end of the spring and the fixing member, the pressure controller pad counteracting any imbalance between the second end of the spring and the fixing member;
   wherein the communicated hydraulic fluid pressure sliding the piston reduces brake lock and dampens abrupt changes in the communicated hydraulic fluid pressure.

2. The apparatus of claim 1 wherein the rod extension of the piston has a first end and a second end, the first end being attached to the shoulder portion of the piston, and the second end extending opposite the first end;
   wherein the fixing member extension concave portion has a bottom; and
   wherein the rod extension of the piston is received within the fixing member extension concave portion, such that the second end of the rod extension of the piston is separated from the fixing member extension concave portion by a rod separation distance, the rod separation distance varying in response to the sliding of the piston within the housing.

3. The apparatus of claim 2 wherein the spring has a biasing force, wherein the communicated hydraulic fluid pressure exerts a force on the piston, and wherein the rod separation distance is reduced upon the force on the piston exceeding the biasing force of the spring.

4. The apparatus of claim 1 wherein the open end of the housing is connected to the closed cylindrical interior portion by a shoulder portion, wherein the expansion portion of the piston is separated from the shoulder portion by a shoulder separation distance, and wherein the shoulder separation distance varies with the sliding of the piston within the closed cylindrical interior portion of the housing.

5. The apparatus of claim 4 wherein the spring has a biasing force, wherein the communicated hydraulic fluid pressure exerts a force on the piston, and wherein the shoulder separation distance is increased upon the force on the piston exceeding the biasing force of the spring.

6. The apparatus of claim 5 wherein the expansion portion stoppably abuts the shoulder portion of the housing when the biasing force of the spring exceeds the force on the piston, the shoulder portion of the housing thereby limiting motion of the piston.

7. The apparatus of claim 1 wherein the housing is connected to the brake master cylinder via a connector.

8. The apparatus of claim 7 wherein the closed cylindrical interior portion of the housing has a closed end, the open end receiving the piston and the closed end being opposite the open end, and wherein the air release valve is located in the closed end.

9. The apparatus of claim 8, wherein the closed cylindrical interior portion of the housing has a cylindrical side wall, and wherein the hydraulic fluid communication valve is located in the cylindrical side wall.

10. The apparatus of claim 1 wherein the fixing member has a fixing member threading, wherein the housing has a housing threading, and wherein the fixing member is fixably attached to the housing via threaded connection of the fixing member threading and the housing threading.

11. The apparatus of claim 1 wherein the brake master cylinder is hydraulically connected to brakes via at least one brake hydraulic line, the apparatus further comprising:
at least one check valve located in the at least one brake hydraulic line, the at least one check valve being located between the housing and the brakes, such that return pressure from the brakes is prevented from being communicated to the closed cylindrical interior portion.

12. The apparatus of claim 1 wherein the brake master cylinder has a closed end and cylindrical sides and includes a brake piston slidable within the brake master cylinder, the brake piston being moveable in a first direction to a maximum displacement distance from the closed end and a second direction to a minimum displacement distance from the closed end, the pressure of the hydraulic fluid being transmitted from the brake master cylinder via the sliding of the brake piston;
wherein the hydraulic line is connected to the brake master cylinder via an opening in the brake master cylinder, the opening in the brake master cylinder being at an opening distance from the closed end, the opening distance being less than the minimum displacement distance.

13. The apparatus of claim 12 wherein the brake master cylinder is operatively coupled to at least one brake, the at least one brake having a brake lining and a frictional surface connected to a wheel, the brake lining and the frictional surface being separated by a brake gap distance, the brake gap distance varying from a minimum brake gap distance when the brake piston is at the minimum displacement distance and a maximum gap distance when the brake piston is at the maximum displacement distance, and wherein air is bleedable from the housing via the air release valve such the maximum gap distance is minimized.

14. An apparatus for regulating hydraulic brake pressure, comprising:
a housing having a closed cylindrical interior portion and an open end, wherein the closed cylindrical interior portion is capable of receiving hydraulic fluid and includes a hydraulic fluid communication valve, the housing being connected via the hydraulic fluid communication valve to a brake master cylinder, the hydraulic fluid communication valve communicating pressure via the received hydraulic fluid between the closed cylindrical interior portion and the brake master cylinder;
a piston having a head receivable within the cylindrical interior portion of the housing, an expansion portion, and a rod extension extending opposite the head, the piston being slidable within the cylindrical interior portion of the housing in response to variations in the communicated hydraulic fluid pressure;
a fixing member fixably attachable to the housing via the open end, the fixing member having an extension extending into the housing, wherein the fixing member extension has a concave portion for receiving the rod extension of the piston, wherein the fixing member extension concave portion has at least one wall, the at least one wall having at least one opening; wherein air is containable within the fixing member extension concave portion, wherein the sliding of the piston within the housing produces movement of an end of the rod extension of the piston, such that the distance between the end of the rod and the fixing member extension concave portion varies, and wherein air flows to and from the fixing member extension concave portion via the at least one opening in response to sliding of the piston in the housing;
a spring extending between the expansion portion of the piston and the fixing member, the spring having a first end and a second end, the first end of the spring abutting the expansion portion of the piston, wherein the spring biasedly opposes movement of the piston toward the fixing member; and
a pressure controller pad abuttably located between the second end of the spring and the fixing member, the pressure controller pad counteracting any imbalance between the second end of the spring and the fixing member;
wherein the communicated hydraulic fluid pressure sliding the piston reduces brake lock and dampens abrupt changes in the communicated hydraulic fluid pressure.

15. An apparatus for regulating hydraulic brake pressure, comprising:
a first pressure regulating device, the first pressure regulating device including:
a first housing having a first closed cylindrical interior portion and an open end, wherein the first closed cylindrical interior portion is capable of receiving hydraulic fluid and includes a first hydraulic fluid communication valve, the first housing being connected via the first hydraulic fluid communication valve to a first chamber of a brake master cylinder, the first hydraulic fluid communication valve communicating pressure via the received hydraulic fluid between the first closed cylindrical interior portion and the first chamber of the brake master cylinder;
a first piston having a first piston head receivable within the cylindrical interior portion of the first housing, an expansion portion, and a rod extension extending opposite the first head, the first piston being slidable within the first cylindrical interior portion of the first housing in response to variations in the communicated hydraulic fluid pressure;
a first fixing member fixably attachable to the first housing via the first housing open end, the first fixing member having a first extension extending into the first housing, wherein the first fixing member extension has a first concave portion for receiving the rod extension of the first piston, wherein the first fixing member extension concave portion has at least one wall, the at least one wall having at least one opening; wherein air is containable within the first fixing member extension concave portion, wherein the sliding of the first piston within the first housing produces movement of an end of the rod extension of the first piston, such that the distance between the end of the rod and the first fixing member extension concave portion varies, and wherein air flows to and from the first fixing member extension concave portion via the at least one opening in response to sliding of the first piston in the first housing;
a first spring extending between the first expansion portion of the first piston and the first fixing member, the first spring having a first end and a second end, the first end of the first spring abutting the expansion portion of the first piston, wherein the first spring biasedly opposes movement of the first piston toward the first fixing member; and
a first pressure controller pad abuttably located between the second end of the first spring and the first fixing member, the first pressure controller pad counteracting any imbalance between the second end of the first spring and the first fixing member; and a second pressure regulating device, the second pressure regulating device including:
- a second housing having a second closed cylindrical interior portion and an open end, wherein the second closed cylindrical interior portion is capable of receiving hydraulic fluid and includes a second hydraulic fluid communication valve, the second housing being connected via the second hydraulic fluid communication valve to a second chamber of the brake master cylinder, the second hydraulic fluid communication valve communicating pressure via the received hydraulic fluid between the second closed cylindrical interior portion and the second chamber of the brake master cylinder;
- a second piston having a second piston head receivable within the second cylindrical interior portion of the second housing, an expansion portion, and a rod extension extending opposite the second head, the second piston being slidable within the second cylindrical interior portion of the second housing in response to variations in the communicated hydraulic fluid pressure;
- a second fixing member fixably attachable to the second housing via the second housing open end, the second fixing member having a second extension extending into the second housing, wherein the second fixing member extension has a second concave portion for receiving the rod extension of the second piston, wherein the second fixing member extension concave portion has at least one wall, the at least one wall having at least one opening; wherein air is containable within the second fixing member extension concave portion, wherein the sliding of the second piston within the second housing produces movement of an end of the rod extension of the second piston, such that the distance between the end of the rod and the second fixing member extension concave portion varies, and wherein air flows to and from the second fixing member extension concave portion via the at least one opening in response to sliding of the second piston in the second housing; and
- a second spring extending between the expansion portion of the second piston and the second fixing member, the second spring having a first end and a second end, the first end of the second spring abutting the expansion portion of the second piston, wherein the second spring biasedly opposes movement of the second piston toward the second fixing member; and
- a second pressure controller pad abuttably located between the second end of the second spring and the second fixing member, the second pressure controller pad counteracting any imbalance between the second end of the second spring and the second fixing member;

wherein the communicated hydraulic fluid pressure between the first pressure regulating device and the first chamber of the brake master cylinder sliding the first piston and the communicated hydraulic fluid pressure between the second pressure regulating device and the second chamber of the brake master cylinder reduce brake lock and dampen abrupt changes in the communicated hydraulic fluid pressure.

* * * * *